United States Patent
Bres et al.

(10) Patent No.: US 8,536,240 B2
(45) Date of Patent: Sep. 17, 2013

(54) EXPANDABLE POLYSTYRENE COMPOSITION

(75) Inventors: Philippe-Luc Bres, Marcq en Baroeul (FR); Christophe Carlier, Lille (FR); Alexandre Gallice, Lille (FR); Uwe Waeckerle, Muhltal (DE)

(73) Assignee: Ineos Commercial Services UK Limited, Hampshire (GB)

( * ) Notice: Subject to any disclaimer, the term of this patent is extended or adjusted under 35 U.S.C. 154(b) by 849 days.

(21) Appl. No.: 10/568,771

(22) PCT Filed: Jul. 14, 2004

(86) PCT No.: PCT/GB2004/003077
§ 371 (c)(1), (2), (4) Date: Feb. 21, 2006

(87) PCT Pub. No.: WO2005/019319
PCT Pub. Date: Mar. 3, 2005

(65) Prior Publication Data
US 2007/0066693 A1 Mar. 22, 2007

(30) Foreign Application Priority Data
Aug. 21, 2003 (FR) ..................................... 03 10073

(51) Int. Cl.
*C08J 9/16* (2006.01)
*C08J 9/20* (2006.01)

(52) U.S. Cl.
USPC ............................ 521/50; 264/55; 264/DIG. 9

(58) Field of Classification Search
CPC ............. C08J 9/16; C08J 9/20; C08J 2491/00
USPC ................................. 264/55, DIG. 9; 521/50
See application file for complete search history.

(56) References Cited

U.S. PATENT DOCUMENTS

| | | | | |
|---|---|---|---|---|
| 5,240,657 A | * | 8/1993 | Harclerode et al. | 264/55 |
| 5,686,497 A | * | 11/1997 | Paleja et al. | 521/56 |
| 6,271,272 B1 | * | 8/2001 | Carlier et al. | 521/56 |
| 6,573,306 B1 | * | 6/2003 | Berghmans et al. | 521/58 |

FOREIGN PATENT DOCUMENTS

| | | |
|---|---|---|
| EP | 0 987 293 A | 3/2000 |
| FR | 2 780 406 | 12/1931 |
| WO | WO 96/15182 A2 | 5/1996 |
| WO | WO 96/15182 A3 | 5/1996 |
| WO | WO 02/46284 | 6/2002 |

OTHER PUBLICATIONS

"Paraffin", www.wikipedia.com, accessed Mar. 24, 2011.*
"Primol 352", http://www.protoninter.com/index.php?mo=28&id=20085, accessed Mar. 25, 2011, the information in the attached NPL comes from an ExxonMobil document, which can be obtained from www.lubebank.com.*

* cited by examiner

Primary Examiner — Yogendra Gupta
Assistant Examiner — Alison Hindenlang
(74) Attorney, Agent, or Firm — Nixon & Vanderhye

(57) ABSTRACT

An expandable polystyrene composition in the form of expandable beads, comprising by weight (1) 100 parts of a styrene polymer, (2) from 2.2 to less than 4.0 parts of at least one blowing agent, and (3) from 0.01 to 0.4 part of at least one plasticizing. The composition is particularly useful for manufacturing medium density expanded moulded polystyrene objects, particularly with a density from 40 to 190 g/l. A process for manufacturing such objects,is provided, together with pre-expanded beads with a buld density of 40 to 190 g/l, containing by weight (a) 100 parts of a styrene polymer, (b) from 0.5 to less than 3.0 parts of at least one blowing agent, and (c) from 0 to 0.4 part of at least one plasticizing agent.

10 Claims, No Drawings

US 8,536,240 B2

EXPANDABLE POLYSTYRENE COMPOSITION

This application is the U.S. National Phase of International Application PCT/GB2004/003077, filed 14 Jul. 2004, which designated the U.S. PCT/GB2004/003077 claims priority to French Application No. 0310073 filed 21 Aug. 2003 The entire content of these applications are incorporated herein by reference.

The present invention relates to an expandable polystyrene composition in the form of beads, a process for preparing the composition, a process for manufacturing medium-density expanded moulded polystyrene objects using the composition, and pre-expanded beads obtainable during the manufacture of the objects.

BACKGROUND OF THE INVENTION

It has been known for a long time that polystyrene beads can be rendered expandable by incorporating in them a blowing agent (or expansion agent) such as a volatile liquid hydrocarbon, for example pentane, and that the beads thus obtained can be used in the manufacture of expanded moulded polystyrene objects. The expanded moulded polystyrene is a relatively rigid and not very dense cellular material, its properties depending mainly on the quantity of blowing agent present in the expandable polystyrene beads and on the cellular structure of the expanded moulded polystyrene.

The expanded moulded polystyrene objects most common in commerce are intended for the heat-insulation of buildings and for the packaging of industrial or food articles. They usually form part of a so-called low-density grade of expanded moulded polystyrene, exhibiting in particular a density of from 10 to 30 g/l approximately. For said type of grade of expanded moulded polystyrene, the quantity of blowing agent present in the expandable polystyrene beads, prior to any expansion, is generally chosen from a range of about from 6 to 9 wt % compared with the total weight of the beads.

The process for manufacturing expanded moulded polystyrene objects generally comprises the following stages: (i) a stage of pre-expansion by heating the expandable polystyrene beads so as to form pre-expanded beads having a desired density, (ii) a stage of stabilisation ("maturing" or "ageing") of the pre-expanded beads for a specified period and (iii) a stage of moulding of the stabilised beads by heating them in a mould so as to weld the beads to one another.

American U.S. Pat. Nos. 5,086,078, U.S. 5,110,836, U.S. 5,110,837, U.S. 5,114,640, U.S 5,115,066 and U.S. 5,240,657 disclose processes for manufacturing low-density expanded moulded polystyrene objects, generally having a density of from 13 to 32 g/l, particularly from 13 to 18 g/l. Nothing is said about manufacturing medium-density expanded moulded polystyrene objects. The objective of these processes is to reduce emissions into the atmosphere of volatile organic blowing agent when manufacturing low-density expanded moulded polystyrene objects. The processes employ expandable polystyrene compositions in the form of beads containing a specific polystyrene having a narrow polydispersity, in particular of less than 2.0, for example of from 1.7 to 1.98, and exhibiting a high degree of expandability. A blowing agent is incorporated into the polystyrene in an amount of from 2 to 5.5 wt % or from 2 to 4.4 wt %. Furthermore, the expandable polystyrene compositions comprise no plasticising agent. The processes for manufacturing the low-density expanded moulded polystyrene objects comprise a plurality of successive stages of pre-expansion of the beads prior to the moulding stage, for example from 2 to 5 stages, each pre-expansion stage being followed by a stabilisation stage lasting from 1 to 80 hours. Said processes have the disadvantage of employing multiple pre-expansion and stabilisation stages, which make the processes relatively complex, costly and unproductive.

For many years, special grades of expandable polystyrene intended for so-called high- or medium-density expanded moulded polystyrene objects have been developed for specific applications such as the industrial packaging of heavy objects and/or subjected to strong forces, for example to strong pressure, or else been developed for far more specific applications such as helmets or platform shoes.

American U.S. Pat. No. 3,973,884 discloses a process for manufacturing a medium- or high-density polystyrene foam, more particularly with a density ranging for example from 130 to 190 g/l or from 260 to 320 g/l. The process employs expandable polystyrene beads having a content of pentane of from 5.8 to 7.0 wt % or from 5.6 to 6.8 wt %, which content is considered to be slightly less than that of 6.0 to 7.2 wt % applied conventionally for low-density polystyrene foams. It has been observed that in said process the stage of stabilisation of the pre-expanded beads must be carried out over an excessively long period, of the order of one or more weeks.

American U.S. Pat. No. 4,032,609 discloses a process for the pre-expansion and moulding of expandable polystyrene beads, intended for the subsequent manufacture of expanded moulded polystyrene objects in particular of relatively high density, capable of ranging for example from 128 to 240 g/l. The process comprises in particular a pre-expansion of the expandable beads for a specified period at the end of which the beads are subjected to a super-atmospheric pressure by means of a gas, so as to prevent any additional expansion of the beads. Pre-expanded beads of uniform density are thus obtained, which are then moulded into expanded objects more particularly of high density. The expandable polystyrene beads contain a blowing agent in a quantity of from 2 to 15 wt %, more particularly from 3 to 10 wt %. In particular, the American patent shows the use of expandable polystyrene beads containing 6 wt % of pentane which are then intended to be pre-expanded and moulded into high-density objects, for example with a density a density of 192 g/l. It was observed that in this case the stage of stabilisation of the pre-expanded beads must be carried out for an excessively long period more particularly of one or more weeks.

European patent application EP 0 987 293 discloses a process for manufacturing objects of low-density expanded polystyrene which are intended more particularly for packaging. The process is aimed at resolving the problem of the uncontrolled losses to the atmosphere of blowing agent during the transport and the storage of the expandable polystyrene particles, prior to the manufacture of the expanded objects. The process proposes the use of expandable polystyrene particles having a low content of blowing agent, which can be from 0.5 to 4.0 wt % compared with the polystyrene. However, in practice according to the examples, the blowing agent content specifically is equal to 1.6 or to 2.1 wt %. The process comprises a stage of pre-expansion of the expandable polystyrene particles so as to form "porous" (or pre-foamed) particles having a residual content of blowing agent less than or equal to 2 wt % and a very high bulk density of 600 to 200 g/l. It is emphasised that, contrary to the conventional processes, the "porous" particles are for practical purposes not expandable any further. The process therefore necessarily comprises an additional stage of impregnation of the "porous" particles by means of a fresh quantity of blowing agent, so as to render said particles expandable once again and to then mould them into expanded finished objects. However, the process has the drawback of employing an additional stage of impregnation by a blowing agent after the pre-expansion stage. Moreover, the patent application says nothing about a possible stage of stabilisation of the pre-expanded particles and the operating conditions of said stage. In addition, it is silent about manufacturing medium-density expanded moulded polystyrene objects.

International patent application WO 02/46284 discloses a process for manufacturing expanded moulded polystyrene objects in particular of low density, which can be for example from 12 to 30 g/l. The process proposes reducing the losses to the atmosphere of blowing agent, such as pentane, in particular during the stages of expansion and moulding of the expanded objects. The process employs an expandable polystyrene composition in the form of particles or pellets, having a content by weight of blowing agent of less than 10.0%, preferably less than 9.0%, and in particular of between 3.0 and 9.0%. Furthermore, the expandable polystyrene composition comprises no plasticising agent. The process comprises a stage of pre-foaming by heating (between 70° C. and 110° C.) of the expandable polystyrene particles, under an absolute pressure of 70 to 170 kPa, so as to form "foamed cellular particles" having a very high bulk density in particular of between 550 and 200 g/l, and a content by weight of blowing agent of less than 6%, in particular of between 2.0 and 5.0%. The advantage of said process compared with that described in European patent application EP 0 987 293 comes from the fact that the "foamed cellular particles" have a sufficient quantity of blowing agent such that said particles are still expandable and no longer require to be impregnated by a fresh quantity of blowing agent. The process for manufacturing expanded moulded polystyrene objects comprises in addition the other conventional stages, that is to say pre-expansion, stabilisation and moulding. However, the result is that the pre-foaming stage constitutes an additional stage compared with the conventional processes, which makes the process complex, costly and unproductive.

French patent application FR 2 780 406 discloses an expandable polystyrene composition in the form of beads comprising from 2 to 9 wt % of a blowing agent compared with the polystyrene. However, in practice according to the examples, the blowing agent content effectively is substantially high and specifically in the range of from 4.4 to 6.28 wt %. Furthermore, the expandable beads are not used for manufacturing medium-density expanded moulded polystyrene objects, but only objects of high density, e.g. of from 13.3 to 26 g/l according to the examples.

SUMMARY OF THE INVENTION

An expandable polystyrene composition in the form of beads has now been found, which is particularly suitable for manufacturing medium-density expanded moulded polystyrene objects, together with a process for manufacturing said objects which employs the composition and makes it possible in particular to avoid the problems mentioned above. The medium-density expanded moulded polystyrene objects thus obtained according to the invention exhibit in particular a highly uniform density and very good mechanical properties which are suitable in particular for the specific applications of the medium-density expanded moulded polystyrene objects. They exhibit for example an excellent compromise between a uniform medium density and very good compressive, bending and pullout strengths (defining a good cohesion of the object). In addition, the process for manufacturing the medium-density expanded moulded polystyrene objects exhibits with advantage a very high productivity in particular compared with the conventional processes, by reason of the fact that it can be carried out in a much shorter time. It comprises in particular a stage of stabilisation of the pre-expanded beads that can be carried out in an extremely short period, for example of the order of about a day instead of one or more weeks. The moulding stage is also generally performed in a shorter time than in the conventional processes.

The present invention relates first of all to an expandable polystyrene composition in the form of expandable beads, in particular suitable to be used for manufacturing medium-density expanded moulded polystyrene objects with a density chosen more particularly from a range of from 40 to 190 g/l, which composition is characterised in that it comprises by weight:

(1) 100 parts of a polymer of styrene having in particular a mean molecular mass by weight, Mw, chosen from a range of from 150 000 to 300 000 daltons, (2) from 2.2 to less than 4.0 parts of at least one blowing agent, preferably chosen from linear or branched (cyclo)alkanes having in particular from 4 to 6 carbon atoms, and (3) from 0.01 to 0.4 parts of at least one plasticising agent, preferably chosen from mineral oils, white oils, paraffin waxes and Fischer-Tropsch waxes.

By "medium-density expanded moulded polystyrene objects" is meant generally objects having a density chosen from a range of from 40 to 190 g/l, preferably from 45 to 180 g/l, particularly from 60 to 150 g/l or from 50 to 150 g/l, and more particularly from 60 to 125 g/l or from 50 to 125 g/l. Owing to this choice of density, the expanded moulded polystyrene objects can be used in specific applications such as those mentioned above.

The expandable polystyrene composition comes in the form of expandable beads which contain a blowing agent and which have not generally been subjected to any prior expansion. The beads are called "expandable", that is to say capable of subsequent expansion, in particular without the assistance of a supplementary addition of blowing agent. By "beads" is meant generally spherical particles or spheroidal particles that possess a large diameter and a small diameter and whose ratio between the large diameter and the small diameter generally lies in a range of from 1.0 to 1.3, preferably from 1.0 to 1.2, particularly from 1.0 to 1.1.

The expandable beads can have a size or a diameter chosen from a range of from 0.3 to 3.0 mm, preferably from 0.3 to 2.0 mm, particularly from 0.4 to 1.5 mm, more particularly from 0.4 to 1.2 mm. It was found that by selecting beads of relatively small size it is generally possible to obtain pre-expanded beads and medium-density expanded moulded polystyrene objects of which have in particular a uniform density and which present an improved compromise of properties, namely a compromise between a highly uniform medium density and very good mechanical properties such as those mentioned above.

The expandable beads can have a bulk density chosen from a range of from 560 to 700 g/l, preferably from 580 to 700 g/l and in particular from 600 to 680 g/l.

The polymer of styrene present in the expandable beads can be a homo-poly-styrene or a co-polymer of styrene containing at least 50%, preferably at least 80%, more particularly at least 90% by weight of styrene. The co-monomer(s) present in the co-polymer of styrene can be chosen from alpha-methylstyrene, a styrene halogenated in the aromatic ring, a styrene alkylated in the aromatic ring, acrylo-nitrile, an ester of acrylic acid or methacrylic acid or of an alcohol containing from 1 to 8 carbon atoms, N-vinylcarbazole and maleic acid or anhydride. It is preferred to use homo-polystyrene. The mean molecular mass by weight, Mw, of the styrene polymer can be chosen from a range of from 150 000 to 300 000, preferably from 170 000 to 270 000, more particularly from 180 000 to 250 000 daltons. The molecular weight distribution of the styrene polymer, calculated by the ratio of Mw to the mean molecular mass by number, Mn, of the polymer, can be from 1.8 to 2.6, preferably from more than 2.0 to less than 2.6, more particularly from 2.1 to 2.5. The polymer of styrene can have a relatively low content of residual monomer, preferably less than 2000 or 1000 parts by weight per million (ppm), particularly less than 800 ppm, in particular less than 600 ppm, and more particularly less than 400 ppm.

The composition contains, per 100 parts by weight of polymer of styrene, 2.2 to less than 4.0 parts, preferably 2.3 to 3.9 parts, more particularly 2.4 to 3.8 parts, in particular 2.5 to 3.5 parts by weight of at least one blowing agent. If the quantity of blowing agent in the composition is excessive, the problems mentioned above can be encountered, particularly in the stages of pre-expansion and moulding of the process for manufacturing medium-density expanded moulded polystyrene objects. In particular, a heterogeneity of density can be encountered in the pre-expanded beads and in the expanded moulded objects. Furthermore, the duration of the stage of stabilisation of the pre-expanded beads can generally be extremely long and can reach one or more weeks. In addition, the duration of the moulding stage can also be relatively long, so that overall the productivity of the process for manufacturing medium-density expanded moulded polystyrene objects is very low. An excessively small quantity of blowing agent can make the beads insufficiently expandable to attain the desired density.

The blowing agent can be chosen from linear or branched (cyclo)alkanes having more particularly from 4 to 6 carbon atoms, preferably from linear or branched (cyclo)alkanes having 5 carbon atoms, in particular from n-pentane, isopentane and mixtures of the latter, e.g. a mixture of 75/25 or 85/15 by weight respectively of n-pentane and isopentane. The blowing agent can contain n-pentane, or it can be a mixture containing 50 to 100 wt % of n-pentane and 0 to 50 wt % of isopentane, preferably 60 to 95 wt % of n-pentane and 5 to 40 wt % of isopentane, more particularly 70 to 90 wt % of n-pentane and 10 to 30 wt % of isopentane.

The composition contains, per 100 parts by weight of polymer of styrene, 0.01 to 0.4 part, preferably 0.01 to 0.35 part, particularly 0.01 to 0.3 part, in particular 0.01 to 0.25 part by weight of at least one plasticising agent. It was found that the problems mentioned above in the manufacture of medium-density expanded moulded polystyrene objects can be resolved if the composition contains simultaneously the blowing agent in a specific quantity and a plasticising agent in the quantities mentioned. An excess of plasticising agent in the composition can lead, in fact, to a stage of stabilisation of the pre-expanded beads and/or to a moulding stage having a particularly long duration. A deficiency of plasticising agent can lead to pre-expanded beads and objects of non-uniform medium density. The plasticising agent can be chosen from mineral oils, white oils, paraffin waxes and Fischer-Tropsch waxes. It is preferred to use mineral oils, white oils or paraffin waxes, and more particularly mineral oils or white oils. Paraffin waxes or Fischer-Tropsch waxes can be used particularly when the composition contains a fire-resistant or flame-retarding agent, in particular chosen from brominated hydrocarbon compounds.

The mineral oils and the white oils are generally substances liquid at ambient temperature (20° C.). They can be chosen from linear or branched, preferably saturated, aliphatic hydrocarbons, having particularly from 18 to 50, in particular from 18 to 40 carbon atoms, or else having on average per molecule from 20 to 40, preferably from 25 to 38 carbon atoms. The mineral oils and the white oils can have a dynamic viscosity at 25° C. of from 100 to 200, notably from 110 to 170 mPa·s, and a density of from 0.8 to 0.9. The mineral oil known under the trade name "PRIMOL 352"® sold by Esso France can be chosen.

The paraffin waxes are natural waxes, in particular petroleum waxes. They are generally substances solid at ambient temperature (20° C.). They are generally composed of a mixture of linear or branched alkanes ranging from $C_{18}$ to $C_{80}$, preferably from $C_{20}$ to $C_{70}$, more particularly from $C_{20}$ to $C_{50}$. The distribution of the alkanes in the mixture can be such that the main constituent by weight is one or more linear or branched alkanes from $C_{24}$ to $C_{40}$, preferably from $C_{25}$ to $C_{38}$, and in particular whose content by weight for each of the alkanes in the mixture can be from 2 to 25%, preferably from 3 to 20%. It is possible to use a paraffin wax recommended by the European Wax Federation (EWF), in particular in the document entitled "Summaries of National Regulations Affecting Wax Usage, Brussels, 1991": a paraffin wax in particular is involved that has a distribution of the number of carbon atoms of n-alkanes of from 18 to 45, preferably from 20 to 45, and has a content of iso- and cyclo-alkanes of from 0 to 40% by weight and a content of n-alkanes of from 100 to 60% by weight. The measurement of the contents of n- and iso-alkanes and the determination of the distribution of the number of carbon atoms and the preponderant alkane by weight in the mixture can be carried out by gas phase chromatography at high temperature, such as that recommended by the standard methods "M-V9" of the "Deutsche Gesellschaft für Fettwissenschaften" (DGF) (see also A. Case, Adhes. Age, 33 (1990), 28-31; A. Aduan et al., J. Pet. Res., 6 (1987), 63-76), or else by the standard EWF method for the analysis of hydrocarbon waxes by gas phase chromatography (according to ASTM D 4626 standard). The paraffin waxes can also be mixtures of from 45 to 100 wt % of n-alkanes and from 0 to 55 wt % of iso- and/or cyclo-alkanes, more particularly of from 50 to 95 wt % of n-alkanes and from 5 to 50 wt % of iso- and/or cyclo-alkanes. In particular, the content of n-alkanes in the paraffin waxes can be from 45 to 85 wt %, or 50 to 75 wt %. The paraffin waxes can be chosen from semi-refined, refined and deoiled paraffin waxes. In particular, paraffin waxes having an oil content (according to ASTM D 721 standard or NFT 60-120 standard) less than or equal to 1.5 wt %, preferably less than or equal to 1.0 wt %, more particularly less than or equal to 0.5 wt %, are preferred. It is possible to choose a paraffin wax having a dynamic viscosity at 100° C. (according to ASTM D 445 or NFT 60-100 standard) of from 1 to 17 $mm^2/s$, preferably from 1 to 15 $mm^2/s$, more particularly from 2 to 9 $mm^2/s$. The paraffin waxes can have a density at 15° C. (according to ASTM D 1298 or NFT 60-101 standard) of from 770 to 915 $kg/m^3$, preferably from 780 to 910 $kg/m^3$, and a needle penetration at 25° C. (according to ASTM D 1321 or NFT 60-123 standard) of from 10 to 60, preferably from 12 to 55 (1/10 mm). They can also have a melting point (according to ASTM D 87 or NFT 60-114 standard) of more than 50° C. to less than 70° C., more particularly from 52° C. to 68° C., or else have a freezing point (according to ASTM D 938 standard) of from 48° C. to 68° C., more particularly from 50° C. to 66° C. For example, it is possible to choose a paraffin wax from the waxes known under the trade names: "MOBILWAX 130"®, "MOBILWAX 135"® or "MOBILWAX 145"® sold by Mobil Oil France, or "CERA 5860"® sold by Repsol France, or "PARAFFINE 58/60"® sold by Total (France), or "OKERIN 5399"® or "OKERIN 5400"® sold by Allied Signal Speciality Chemicals, Astor Limited (England).

The composition is preferably a homogeneous composition, in particular a composition such that the blowing agent and more particularly the plasticising agent are distributed through the composition and more particularly inside the beads in a uniform manner.

The composition can, in addition, contain one or more coating agents chosen from the salts and esters of carboxylic acid, preferably the salts and the esters of fatty acid containing more particularly from 4 to 22 carbon atoms. It is preferred to choose the coating agent(s) from the salts and the esters of stearic acid, in particular from glycerol mono-, di- and tristearates and zinc, calcium and magnesium stearates. The quantity of coating agent(s) in the composition can be from 0.2 to 0.6 parts, preferably from 0.3 to 0.5 parts by weight per 100 parts by weight of styrene polymer. A composition containing a plurality of coating agents is preferred, in particular glycerol monostearate (GMS), glycerol distearate (GDS) and/or glycerol tristearate (GTS) and zinc stearate. GDS and GTS are relatively non-polar compounds and generally have the effect of promoting the penetration of air and steam to the interior of the beads during the pre-expansion and the moulding. GMS and zinc stearate are amphiphilic compounds (that is to say compounds having both a hydrophilic character and a lipophilic character) and have the effect of improving the flow properties of the beads. They can also act as antistatic agents. Thus, for 100 parts by weight of styrene polymer, the composition can contain (i) from 0.02 to less than 0.1 part, preferably from 0.03 to 0.08 part, more particularly from 0.05 part to 0.07 part by weight of GMS, (ii) from more than 0.2 to 0.5 part, preferably from 0.25 to 0.4 part, more particularly from 0.25 to 0.35 part by weight of GDS and/or GTS, and (iii) from 0.02 to less than 0.06 part, preferably from 0.03 to 0.05 part by weight of zinc stearate.

The composition can contain one or more other additives, in particular chosen from fire-proofing or flame-retardant agents, preferably selected from halogenated hydrocarbons, in particular brominated hydrocarbons, for example hexabromocyclododecane, in a quantity of from 0.1 to 2 parts, preferably from 0.5 to 1 part, more particularly from 0.6 to 0.9 part by weight for 100 parts of the polymer of styrene. The composition can also contain one or more additives, chosen from fillers, in particular mineral fillers, infrared absorbing compounds such as carbon black, titanium oxide, alumina, graphite, expandable graphite or expanded graphite, chain transfer agents such as mercaptans or alpha-methylstyrene dimer, crosslinking agents such as butadiene or divinylbenzene, and nucleation agents such as waxes, in particular synthetic waxes, for example polyolefin waxes, in particular polyethylene waxes.

The composition can be prepared according to a process carried out in one or more stages, comprising in particular a stage of (co-)polymerisation of the styrene in aqueous suspension. The process in one stage can comprise a (co-)polymerisation of the styrene in aqueous suspension carried out in the presence of the blowing agent and the plasticising agent. The composition is generally obtained in the form of expandable beads at the end of the polymerisation and is recovered after having separated the beads from the aqueous polymerisation medium and optionally after having coated the beads with the coating agent(s) mentioned above.

The process of preparation in two stages can comprise a first stage of (co-)polymerisation of the styrene in aqueous suspension carried out in the presence of the plasticising agent so as form beads of styrene polymer, and a second stage of impregnation of the beads by the blowing agent more particularly in an aqueous medium. The composition is then obtained in the form of expandable beads and is recovered after having separated the beads from the aqueous medium and optionally after having coated the beads with the coating agent(s).

Whatever the process for preparing the composition, the quantities of blowing agent and plasticising agent used in the preparation can in particular be chosen so that they lead in the final analysis to the quantities desired in the composition according to the invention.

The (co-)polymerisation of the styrene in aqueous suspension can be carried out at a temperature of 80 to 150° C., generally in the presence of one or more free radical initiators chosen in particular from peroxides, hydroperoxides, peroxycarbonates, peracetals and peresters, in a quantity ranging from 0.1 to 1.0 wt % compared with the styrene monomer. The initiators can be in particular chosen from peroxides, such as dibenzoyl peroxide, dicumyl peroxide or ditertiobutyl peroxide, peroxycarbonates, such as tertio-butylperoxy-2-ethylhexyl-carbonate, tertioamylperoxy-2-ethylhexyl-carbonate, tertioamylperoxy-isopropyl-carbonate or tertiobutylperoxy-stearyl-carbonate, peracetals, such as 2,2-bis(tertiobutylperoxy)-butane or 1,1-bis(tertiobutyl-peroxy)-cyclohexane, and peresters, such as tertiobutyl perbenzoate.

The (co-)polymerisation is generally carried out in the presence of one of more suspension stabilisation agents, in particular organic agents such as polyvinyl alcohols, hydroxyethylcellulose, methylcellulose, sodium dodecylbenzenesulfonate, polyacrylamides and polyvinylpyrrolidones, or inorganic suspension stabilisation agents such as alumina, bentonite, magnesium silicate, magnesium oxide, tricalcium phosphate, barium phosphate or magnesium pyrophosphate. The (co-)polymerisation can also be carried out in the presence of one or more other additives, such as those mentioned above.

The present invention relates also to a process for manufacturing medium-density expanded moulded polystyrene objects, using in particular the expandable polystyrene composition described above.

The present invention also relates to a use of the expandable polystyrene composition described above for manufacturing medium-density expanded moulded polystyrene objects.

More particularly, the invention relates to a process for manufacturing medium-density expanded moulded polystyrene objects, characterised in that it employs an expandable polystyrene composition in the form of expandable beads, containing by weight (1) 100 parts of a styrene polymer such as that described above, (2) from 2.2 to less than 4.0 parts of at least one blowing agent such as one of those described above and (3) from 0 to 0.4 parts of at least one plasticising agent such as one of those mentioned above, and in that it comprises the following stages:

(i) a pre-expansion stage carried out by heating of the expandable beads, so as to form pre-expanded beads with a bulk density chosen from a range of from 40 to 190 g/l, (ii) a stabilisation stage carried out by contacting the pre-expanded beads with a gaseous medium, in particular air or ambient air, at a temperature of from 0 to 40° C., under an absolute pressure of from 50 to 160 kPa, for a period of from 6 to 48 hours, and (iii) a moulding stage by introducing and heating the beads thus stabilised into a mould, so as to weld the beads to one another and to form the medium-density expanded moulded polystyrene objects.

The present invention also relates to intermediate products in the form of pre-expanded beads that can be obtained at the end of the pre-expansion stage described above, and more particularly before the stabilisation stage. The beads, pre-expanded as described above, can be more particularly prepared according to a process comprising a pre-expansion stage carried out by heating expandable beads such as those used in the process described above for manufacturing medium-density expanded moulded polystyrene objects, up to the obtaining of pre-expanded beads with a bulk density chosen from a range of from 40 to 190 g/l, preferably from 45 to 180 g/l, more particularly from 50 or 60 to 150 g/l, in particular from 50 or 60 to 125 g/l. A portion of the blowing agent initially contained in the expandable beads is generally lost during the pre-expansion stage. Thus, the blowing agent content in the pre-expanded beads is generally lower than in the expandable beads.

More particularly, the invention relates to pre-expanded beads, preferably obtainable at the end of the pre-expansion stage of the process described above for manufacturing medium-density expanded moulded polystyrene objects, which have a bulk density chosen from a range of from 40 to 190 g/l and contain by weight:

(a) 100 parts of a polymer of styrene, having preferably a mean molecular mass by weight, Mw, chosen from a range of 150 000 to 300 000 daltons, (b) from 0.5 to less than 3.0 parts of at least one blowing agent, preferably chosen from linear or branched (cyclo)alkanes having more particularly from 4 to 6 carbon atoms, and (c) from 0 to 0.4 part of at last one plasticising agent, preferably chosen from mineral oils, white oils, paraffin waxes and Fischer-Tropsch waxes.

The pre-expanded beads according to the invention are, preferably, expandable and in particular capable of subsequent expansion without the assistance of an addition of a fresh quantity of blowing agent. The pre-expanded beads have a bulk density chosen from a range of from 40 to 190 g/l, preferably from 45 to 180 g/l, particularly from 50 or 60 to 150 g/l, more particularly from 50 or 60 to 125 g/l. Furthermore, they have preferably a size or a diameter chosen from a range of from 0.5 to 3.5 mm, particularly from 0.6 to 3.0 mm, in particular from 0.6 to 2.5 mm. By "beads" is meant generally spherical or spheroidal particles having a definition identical to that given above. Owing particularly to the selection of the size of the pre-expanded beads, it is possible in the final analysis to obtain medium-density expanded moulded polystyrene objects which have in particular a highly uniform bulk density and improved mechanical properties such as those mentioned above that are specifically suited to medium-density objects. The pre-expanded beads can have a highly uniform density such that the bulk density does not vary by more than 10%, preferably by more than 5%, as a function of the size of the beads.

The polymer of styrene present in the pre-expanded beads is generally identical or substantially identical to that described above for the expandable polystyrene composition. In particular, it can have a weight Mw of from 150 000 to 300 000, preferably from 170 000 to 270 000, in particular from 180 000 to 250 000 daltons, and a molecular weight distribution, calculated by the ratio of Mw to Mn, of from 1.8 to 2.6, preferably of more than 2.0 to less than 2.6, in particular of from 2.1 to 2.5.

The pre-expanded beads contain, per 100 parts by weight of styrene polymer, from 0.5 to less than 3.0 parts, preferably from 0.7 to 2.9 parts, particularly from 0.9 to 2.8 parts, in particular from 1.0 to 2.7 parts by weight of at least one blowing agent, such as one of those mentioned above. More particularly, it is preferred that the pre-expanded beads contain, per 100 parts by weight of styrene polymer, from 1.6 to less than 3.0 parts, preferably from 1.7 to 2.9 parts, particularly from 1.8 to 2.8 parts, in particular from 1.9 to 2.7 parts by weight of at least one blowing agent such as one of those mentioned above. The quantity of blowing agent in the pre-expanded beads is generally sufficient to carry out suitably and in very good conditions the stabilisation stage and the moulding stage. It must not, in addition, be excessive, if it is desired to carry out the stabilisation stage in a short period, in particular a period of less than one or more weeks. The pre-expanded beads also contain, per 100 parts by weight of styrene polymer, from 0 to 0.4 part, preferably from 0 to 0.35 part, particularly more than 0 to 0.3 part, in particular from 0 to 0.25 part, and more particularly from 0 to 0.20 part by weight of at least one plasticising agent. The plasticising agent is generally identical to that described above for the expandable polystyrene composition. An excess of the plasticising agent in the pre-expanded beads can lead generally to a stage of stabilisation of the pre-expanded beads of an excessive duration. The pre-expanded beads can also be free of plasticising agent.

The pre-expanded beads can, in addition, contain other additives, in particular one or more agents chosen from coating agents, suspension stabilisation agents, antistatic agents, fire-proofing or flame-retardant agents, chain transfer agents, crosslinking agents, nucleation agents, fillers and infrared absorbing agents, such as those mentioned above for the expandable polystyrene composition.

The present invention also relates to a process for manufacturing medium-density expanded moulded polystyrene objects, using in particular the expandable polystyrene composition described above and employing, as intermediate products, in particular the pre-expanded beads described above. The process comprises first of all a stage of pre-expansion by heating the expandable polystyrene composition in the form of beads, so as to form pre-expanded beads with a bulk density chosen from a range of from 40 to 190 g/l, preferably from 45 to 180 g/l, particularly from 50 or 60 to 150 g/l, and more particularly from 50 or 60 to 125 g/l. The beads thus pre-expanded can be, preferably, identical to those described above. It is particularly advantageous to note that the process can comprise, preferably, a single pre-expansion stage, followed then by the stabilisation stage and the moulding stage. The process thus makes it possible to avoid employing a plurality of successive pre-expansion stages, or else an additional stage of impregnation of the beads by means of a fresh quantity of blowing agent. It was observed that in an advantageous manner the pre-expanded beads obtained during the pre-expansion stage do not have a tendency to agglomerate between one another or to form a block.

The pre-expansion stage can be, in particular, carried out by contacting the expandable beads with any means capable of heating the beads, in particular with steam, to a temperature sufficient to soften the expandable polystyrene and to vaporise the blowing agent inside the beads, in particular to a temperature of from 80 to 110° C., preferably from 85 to 105° C., and under an absolute pressure extending from 50 to 160 kPa, preferably from 80 to 150 kPa, or else under an absolute pressure extending from atmospheric pressure to 160 kPa or to 140 kPa. The heating of the beads generally has the effect of reducing the (bulk) density of the beads, which can reach a minimum beyond which a collapse of the cellular structure of the beads and a loss of the blowing agent are generally noted. The heating of the beads is generally stopped before reaching said minimum, in particular at the moment when the desired bulk density is reached. The pre-expansion stage can be carried out for a period of from 0.1 to 10 minutes, preferably from 0.2 to 7 minutes, more particularly from 0.3 to 5 minutes. It can be carried out either discontinuously or continuously, in particular in a pre-expansion zone provided in particular with at least one agitation means so as to improve the contact between the beads and the steam. In a continuous pre-expansion stage, it is possible to calculate the mean residence time of the beads in the pre-expansion zone in such a way that at the end of said time the desired bulk density has been reached. In particular, the setting of the bulk density of the beads is generally effected by acting on the rate of introduction of the beads into the pre-expansion zone, on the pressure of the steam and in certain cases on an addition of air to the steam. At the end of said stage, the pre-expanded beads can be cooled to ambient temperature (generally 20° C.) and dried for example in a fluidised bed which contains the pre-expanded beads and through which flows a current of ambient air.

The process for manufacturing medium-density expanded moulded polystyrene objects then comprises a stabilisation stage carried out by contacting the pre-expanded beads with a gaseous agent, comprising particularly air, in particular the ambient air, at a temperature of from 0 to 40° C., under an absolute pressure of from 50 to 130 kPa, preferably from 80 to 120 kPa, and for a period of from 6 to 48 hours. The stabilisation can be, preferably, carried out at ambient temperature, for example at about 20° C., and under ambient atmosphere pressure. It is remarkable to note that the stabilisation stage is carried out in an extremely short time, of from 6 to 48 hours, preferably from 10 to 30 hours, more particularly from 12 to 26 hours. The stabilisation stage is generally carried out so as to reach an equilibrium between the internal pressure prevailing in the cells of the beads and the external or ambient pressure, and without modifying the cellular structures of the pre-expanded beads. The stage can be carried out in a stabilisation zone open to the (ambient) air, for example a tank, a tower or a bunker fitted in particular with a metallic or man-made fibre cloth allowing the (ambient) air to pass through the beads.

The process comprises, finally, the stage of moulding by introduction of the beads thus stabilised into a mould and by heating of the beads, so as to weld the beads to one another and to thus form the medium-density expanded moulded polystyrene objects. The moulding stage can be carried out in a relatively conventional manner, except that the expanded objects obtained in this way have a density in particular of from 40 to 190 g/l, preferably from 45 to 180 g/l, in particular from 50 or 60 to 150 g/l and more particularly from 50 or 60 to 125 g/l. The objects expanded in this way generally have a density substantially identical to the bulk density of the pre-expanded beads, particularly when the mould is completely filled with the pre-expanded beads. It is observed that owing to said process, the moulding stage is carried in a shorter time than in the conventional processes, and that the medium-density expanded moulded polystyrene objects are manufactured with an improved productivity.

The present invention also relates to medium-density expanded moulded polystyrene objects, characterised in that they are obtained by means of the expandable polystyrene composition described above, or by means of the pre-expanded beads described above, or else that they result from the process for manufacturing medium-density expanded moulded polystyrene objects described above. The expanded moulded polystyrene objects have in particular a density of from 40 to 190 g/l, preferably from 45 to 180 g/l, in particular from 50 or 60 to 150 g/l and more particularly from 50 or 60 to 125 g/l. They have the advantage of possessing a highly uniform medium-density, together with an attractive compromise of properties as described above.

The bulk density of the expandable beads or of the pre-expanded beads can be measured by the known method according to the European standard "EN 1602".

EXAMPLES

The following examples illustrate the present invention.

Example 1

(a) Preparation of an Expandable Polystyrene Composition in the Form of Beads.

Into a reactor fitted with heating, pressurising and stirring means, and heated to 90° C. with stirring, were introduced 100 parts by weight of styrene, 167 parts by weight of demineralised water, 0.8 part by weight of tricalcium phosphate, 2.5 parts by weight of polyvinyl alcohol, 0.3 part by weight of dibenzoyl peroxide, 0.18 part by weight of tertiobutylperoxy-2-ethylhexyl-carbonate (TBPEHC) and 0.25 part by weight of a mineral oil sold under the trade name "PRIMOL 352"® by Esso (France), which was a mixture of linear and branched aliphatic hydrocarbons saturated and having 34 carbon atoms on average per molecule, a mean molecular weight of 480, a density of 0.86 and a dynamic viscosity at 25° C. of 140 mPa·s. The stirred reactor was heated from 90° C. to 100° C. for 1 hour, then from 100° C. to 110° C. for 2 hours and 50 minutes. At the end of said time, there were introduced into the reactor for 1 hour and 45 minutes 3.9 parts by weight of a 75/25 mixture of n-pentane and isopentane, while in the same period the reactor was heated from 110° C. to 113° C. The reactor then continued to be heated from 113° C. up to 140° C. for a period such that the content by weight of residual monomer was equal to 200 ppm. At the end of said time, the reactor was cooled to ambient temperature (20° C.). There was thus obtained, after separation of the aqueous medium, drying and screening, an expandable polystyrene composition in the form of expandable beads. The expandable beads were then coated by means of a mixture containing, per 100 parts by weight of polystyrene, 0.06 part by weight of GMS, 0.3 part by weight of GTS and 0.04 part by weight of zinc stearate. The expandable beads thus obtained contained (1) 100 parts by weight of a polystyrene having a weight Mw equal to 210 000 daltons, a molecular weight distribution, Mw/Mn, equal to 2.3 and a content of residual monomer equal to 200 ppm, (2) 3.3 parts by weight of a 75/25 mixture of n-pentane and isopentane, (3) 0.25 part by weight of the mineral oil "PRIMOL 352"®, (4) 0.6 part by weight of GMS, (5) 0.3 part by weight of GTS and (6) 0.04 part by weight of zinc stearate. The expandable beads were spherical and had a diameter of from 0.6 to 1.0 mm and a bulk density of 650 g/l.

(b) Preparation of Expanded Moulded Polystyrene Objects of Medium Density (50 g/l).

The expanded beads obtained-above were first of all subjected to a discontinuous pre-expansion stage. They were introduced into a pre-expander sold by Kurtz (Germany). Then, steam at the temperature under an absolute pressure of 145 kPa was introduced into the latter at a flow rate of 102 kg/h for 70 seconds. At the end of said time, the pre-expanded beads were cooled to ambient temperature (20° C.) by means of ambient air. The pre-expanded beads thus obtained were expandable, that is to say capable of subsequent expansion without the assistance of an addition of a fresh quantity of blowing agent. They were spherical and had a bulk density of 50 g/l and a diameter of from 1.0 to 1.65 mm. They contained (a) 100 parts by weight of polystyrene having the characteristics mentioned above, (b) 2.5 parts by weight of a mixture of n-pentane and isopentane, (c) 0.25 part by weight of the mineral oil "PRIMOL 352"®, (d) 0.06 part by weight of GMS, (e) 0.3 part by weight of GTS and (f) 0.04 part by weight of zinc stearate. The pre-expanded beads resulted from a very homogeneous expansion and thus had a highly uniform bulk density: as a function of the size of the beads, the bulk density lied in a range equal to 50 g/l±3 g/l.

The beads thus pre-expanded were then subjected to a stabilisation stage. They were introduced into a bunker fitted with a metallic cloth capable of allowing a current of air to pass through. They were contacted with a current of ambient air, at ambient temperature (20° C.) and under ambient atmospheric pressure, for a period of 18 hours. At the end of said time, the beads were stabilised and were then subjected to a moulding stage.

The beads thus stabilised were introduced into a parallelepiped-shaped mould so as to fill it completely. The mould was heated with steam under an absolute pressure of 175 kPa for 22 seconds. At the end of said time, the mould was cooled by means of water to ambient temperature (20° C.) until the absolute pressure in the mould falls to 103 kPa. The total duration of the moulding stage was about 20% shorter than in the conventional processes. The expanded object was removed: it had a medium density of 50 g/l and a compressive strength of 440 kPa (according to the method given in the European standard "EN 13163", more particularly "EN 826").

Example 2

(a) Preparation of an Expandable Polystyrene Composition in the Form of Beads.

Exactly the same procedure was adopted as in Example 1, except that no mineral oil "PRIMOL 352"® was introduced into the reactor. After polymerisation, separation of the aqueous medium, drying and screening, an expandable polystyrene composition in the form of expandable beads was obtained, comprising (1) 100 parts by weight of a polystyrene identical to that obtained in Example 1, (2) 3.3 parts by weight of a 75/25 mixture of n-pentane and isopentane, (3) 0 part by weight of mineral oil, (4) 0.06 part by weight of GMS, (5) 0.3 part by weight of GTS and (6) 0.04 part by weight of zinc stearate. The expandable beads were spherical and had a diameter and a bulk density identical to those of the expandable beads obtained in Example 1.

(b) Preparation of Expanded Moulded Polystyrene Objects of Medium Density (50 g/l).

Exactly the same procedure was adopted as in Example 1, except that the expandable objects obtained above in Example 2 were used. Pre-expanded beads which were spherical and expandable and which had a bulk density of 50 g/l and a size identical to that of the pre-expanded beads obtained in Example 1 were thus obtained. They contained (a) 100 parts by weight of a polystyrene identical to that obtained in Example 1, (2) 2.5 parts by weight of a mixture of n-pentane and isopentane, (c) 0 part by weight of mineral oil, (d) 0.06 part by weight of GMS, (e) 0.3 part by weight of GTS and (f) 0.04 part by weight of zinc stearate. The pre-expanded beads resulted from a less homogeneous expansion than in Example 1. They had a relatively uniform bulk density: as a function of the size of the beads, the apparent density lied in a range equal to 50 g/l±5 g/l.

The pre-expanded beads thus obtained were then subjected to a stabilisation stage identical to that of Example 1.

The beads thus stabilised were then subjected to a moulding stage identical to that of Example 1. An expanded moulded polystyrene object having a medium density of 50 g/l was thus obtained, which also had a compressive strength of 460 kPa (according to the method given in the European standard "EN 13163", more particularly "EN 826").

Example 3

(a) Preparation of an Expandable Polystyrene Composition in the Form of Beads.

Exactly the same procedure was adopted as in Example 1, except that 3.5 parts instead of 3.9 parts by weight of the 75/25 mixture of n-pentane and isopentane were introduced into the reactor. After polymerisation, separation of the aqueous medium, drying and screening, an expandable polystyrene composition in the form of expandable beads was obtained, containing (1) 100 parts by weight of a polystyrene identical to that obtained in Example 1, (2) 2.9 parts by weight of a 75/25 mixture of n-pentane and isopentane, (3) 0.25 part by weight of the mineral oil "PRIMOL 352"®, (4) 0.06 part by weight of GMS, (5) 0.3 part by weight of GTS and (6) 0.04 part by weight of zinc stearate. The expandable beads were spherical and had a diameter identical to that of the expandable beads of Example 1 and a bulk density of 660 g/l.

(b) Preparation of Expanded Moulded Polystyrene objects of Medium-Density (125 g/l).

Exactly the same procedure was adopted as in Example 1, except that the expandable beads obtained above in Example 3 were used, that the pre-expansion stage was carried out in a pre-expander of the "Polytech" type sold by Erlenbach (Germany) and that the introduction of the steam into the pre-expander was carried out under an absolute pressure of 105 kPa for a period of 243 seconds. Pre-expanded beads which were spherical and expandable and which had a bulk density of 125 g/l and a diameter of from 0.69 to 1.20 mm were thus obtained. They contained (a) 100 parts by weight of a polystyrene identical to that of Example 1, (b) 2.2 parts by weight of a mixture of n-pentane and isopentane, (c) 0.25 part by weight of the mineral oil "PRIMOL 352"®, (d) 0.06 part by weight of GMS, (e) 0.3 part by weight of GTS and (f) 0.04 part by weight of zinc stearate. The pre-expanded beads resulted from a very homogeneous expansion and had a highly uniform bulk density: as a function of the size of the beads, the bulk density lied in a range equal to 125 g/l±5 g/l.

The pre-expanded beads thus obtained were then subjected to a stabilisation stage identical to that of Example 1, except that the duration of the stabilisation stage was 24 hours instead of 18 hours The beads thus stabilised were then subjected to a moulding stage identical to that of Example 1, except that the mould used was a mould sold by Kurtz (Germany) and that the heating and cooling times of the mould were 194 seconds and 480 seconds respectively. An expanded moulded polystyrene object having a medium density of 125 g/l was thus obtained.

Example 4

(a) Preparation of an Expandable Polystyrene Composition in the Form of Beads.

Exactly the same procedure was adopted as in Example 2, except that 3.4 parts instead of 3.9 parts by weight of the 75/25 mixture of n-pentane and isopentane were introduced into the reactor. After polymerisation, separation of the aqueous medium, drying and screening, an expandable polystyrene composition in the form of expandable beads was obtained, containing (1) 100 parts by weight of a polystyrene identical to that obtained in Example 1, (2) 2.8 parts by weight of a 75/25 mixture of n-pentane and isopentane, (3) 0 part by weight of mineral oil, (4) 0.06 part by weight of GMS, (5) 0.3 part by weight of GTS and (6) 0.04 part by weight of zinc stearate. The expandable beads were spherical and had a diameter identical to that of the expandable beads of Example 1 and a bulk density of 660 g/l.

(b) Preparation of Expanded Moulded Polystyrene Objects of Medium Density (125 g/l).

Exactly the same procedure was adopted as in Example 3, except that the expandable beads obtained above in Example 4 were used. Pre-expanded beads which were spherical and expandable and which had a bulk density of 125 g/l and a size identical to that of the pre-expanded beads of Example 3 were thus obtained. They contained (a) 100 parts by weight of a polystyrene identical to that obtained in Example 1, (b) 2.1 parts by weight of a mixture of n-pentane and isopentane, (c) 0 part by weight of mineral oil, (d) 0.06 part by weight of GMS, (e) 0.03 part by weight of GTS and (f) 0.04 part by weight of zinc stearate. The pre-expanded beads resulted from a less homogeneous expansion than in Example 3. They had a relatively uniform bulk density: as a function of the size of the beads, the bulk density lied in a range equal to 125 g/l±7 g/l.

The pre-expanded beads thus obtained were then subjected to a stabilisation stage identical to that of Example 1, except that the time of the stabilisation stage is 22 hours instead of 18 hours.

The beads stabilised in this way are then subjected to a moulding stage identical to that of Example 3. An expanded moulded polystyrene object having a medium density of 125 g/l was obtained.

Example 5

(a) Preparation of an Expandable Polystyrene Composition in the Form of Beads.

Exactly the same procedure was adopted as in Example 2, except that 0.4 part by weight of dicumyl peroxide and 0.69 part by weight of hexabromocyclododecane (HBCD) were in addition introduced into the reactor and that 3.7 parts instead of 3.9 parts by weight of the 75/25 mixture of n-pentane and isopentane were introduced into it. After polymerisation, separation of the aqueous medium, drying and screening, an expandable polystyrene composition in the form of expandable beads was obtained, containing (1) 100 parts by weight of a polystyrene having a mass Mw of 200 000 daltons, a molecular weight distribution, Mw/Mn, of 2.2 and a content of residual monomer of 200 ppm, (2) 3.1 parts by weight of a 75/25 mixture of n-pentane and isopentane, (3) 0 part by weight of mineral oil, (4) 0.06 part by weight of GMS, (5) 0.3 part by weight of GTS and (6) 0.04 part by weight of zinc stearate and (7) 0.69 part by weight of HBCD. The expandable beads were spherical and had a diameter and a bulk density identical to those of the expandable beads of Example 1.

(b) Preparation of Expanded Moulded Polystyrene Objects of Medium Density (70 g/l).

Exactly the same procedure was adopted as in Example 1, except that the expandable beads obtained above in Example 5 were used and that the pre-expansion stage was carried out continuously in a pre-expander sold by Wieser (Germany) under an absolute steam pressure of 105 kPa. Pre-expanded beads which were spherical and expandable and which had a bulk density of 70 g/l and a diameter of 1.24 to 2.07 mm were thus obtained. They contained (a) 100 parts by weight of a polystyrene identical to that described in stage (a), (b) 2.3 parts by weight of a mixture of n-pentane and isopentane, (c) 0 part by weight of mineral oil, (d) 0.06 part by weight of GMS, (e) 0.3 part by weight of GTS, (f) 0.04 part by weight of zinc stearate and (g) 0.69 part by weight of HBCD. The pre-expanded beads had a relatively uniform bulk density.

The pre-expanded beads thus obtained were then subjected to a stabilisation stage identical to that of Example 1, except that the time of the stabilisation stage was 20 hours instead of 18 hours.

The beads thus stabilised were then subjected to a moulding stage identical to that of Example 3, except that the heating and cooling times of the mould were 100 and 500 seconds respectively. An expanded moulded polystyrene object having a medium density of 70 g/l was thus obtained, which also had a compressive strength of 630 kPa (according to the method given in the European standard "EN 13163", more particularly "EN 826") and a good fire resistance.

The invention claimed is:

1. Pre-expanded beads having a bulk density chosen from a range of from 40 to 190 g/l and containing by weight:
    (a) 100 parts of a polymer of styrene having a mean molecular mass by weight Mw chosen from a range of from 180,000 to 250,000 and a molecular weight distribution calculated by the ratio of Mw to the mean molecular mass by number, $M_n$, in the range of from 2.1 to 2.5,
    (b) from 0.5 to less than 3.0 parts of at least one blowing agent,
    (c) from 0 to 0.4 part of at least one plasticising agent comprising an oil which is liquid at 20° C., having on average from 25 to 38 carbon atoms, a dynamic viscosity at 25° C. of from 110 to 170 mPa·s and a density of from 0.8 to 0.9, and
    (d) less than 400 ppm of residual styrene monomer,
    wherein the pre-expanded beads are expandable.

2. Pre-expanded beads according to claim 1, wherein the blowing agent is chosen from linear or branched (cyclo)alkanes.

3. Pre-expanded beads according to claim 1, wherein they contain from 0.7 to 2.9 parts by weight of at least one blowing agent.

4. Pre-expanded beads according to claim 1, wherein they contain from 1.6 to less than 3.0 parts by weight of at least one blowing agent.

5. Pre-expanded beads according to claim 1, wherein the plasticising agent is selected from the group consisting of mineral oils, white oils, paraffin waxes and Fischer-Tropsch waxes.

6. Pre-expanded beads according to claim 1, wherein they contain from 0 to 0.35 part of at least one plasticising agent.

7. Pre-expanded beads according to claim 1, wherein they have a size or a diameter chosen from a range of from 0.5 to 3.5 mm.

8. Pre-expanded beads according to claim 1, wherein they have a bulk density chosen from a range of from 45 to 180 g/l.

9. Pre-expanded beads according to claim 1, wherein the pre-expanded beads are capable of subsequent expansion without the addition of a fresh quantity of blowing agent.

10. Pre-expanded beads according to claim 2, wherein the linear or branched (cyclo)alkanes have from 4 to 6 carbon atoms.

* * * * *